W. R. GARDNER.
BEET TOPPER.
APPLICATION FILED NOV. 13, 1912.
1,107,603.
Patented Aug. 18, 1914.
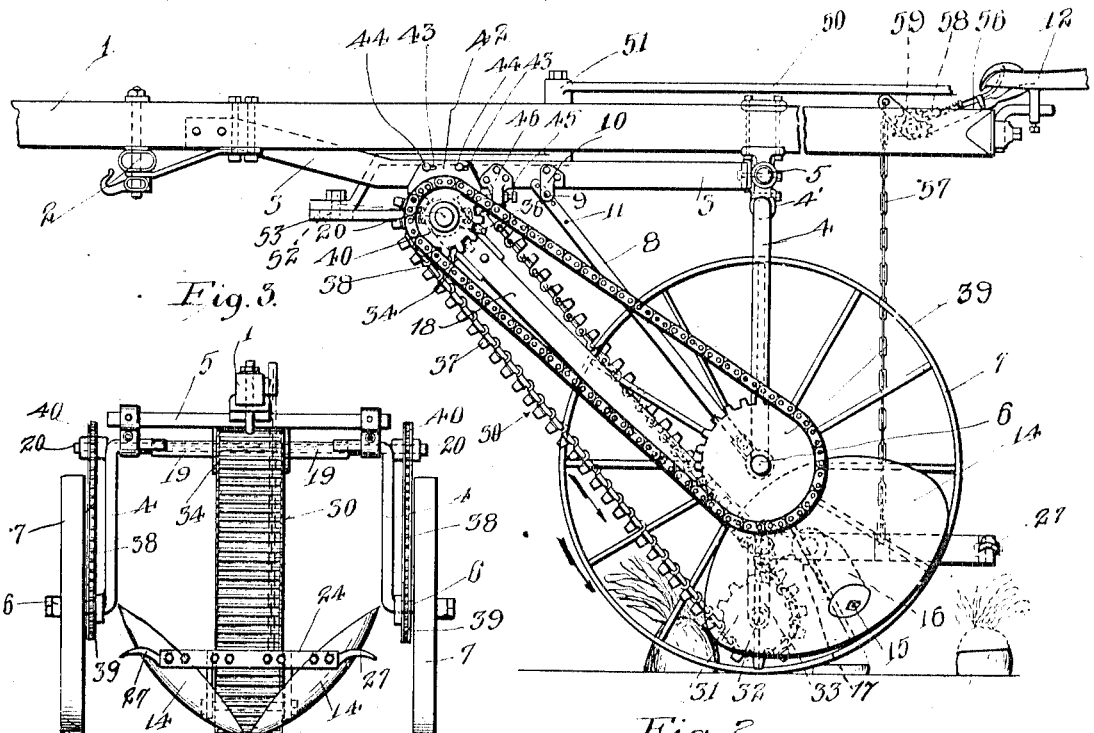
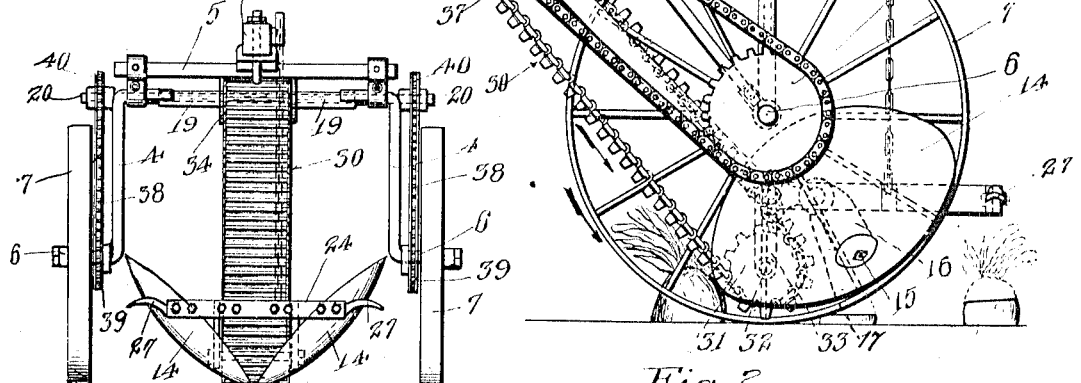
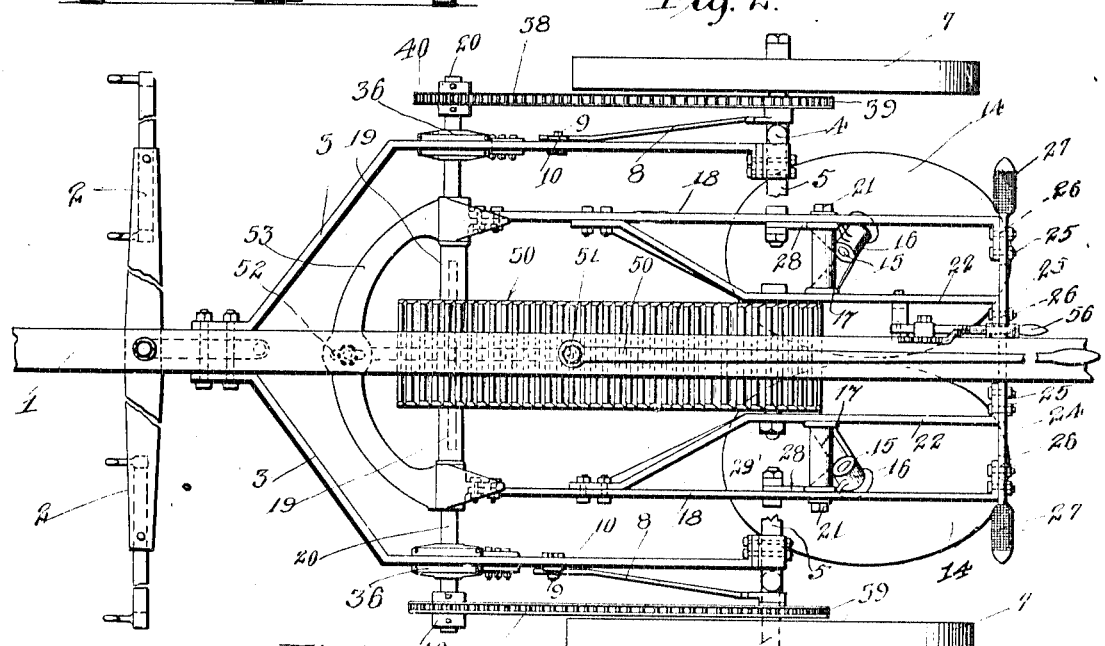
Witnesses
Lully Husto
Martha Lange
Inventor
William R. Gardner
by Syau & Hackley attys.

UNITED STATES PATENT OFFICE.

WILLIAM R. GARDNER, OF LOS ANGELES, CALIFORNIA, ASSIGNOR, BY DIRECT AND MESNE ASSIGNMENTS, TO AMERICAN BEET TOPPER COMPANY, OF LOS ANGELES, CALIFORNIA, A CORPORATION OF CALIFORNIA.

BEET-TOPPER.

1,107,603. Specification of Letters Patent. Patented Aug. 18, 1914.

Application filed November 13, 1912. Serial No. 731,211.

*To all whom it may concern:*

Be it known that I, WILLIAM R. GARDNER, a citizen of the United States, residing at Los Angeles, in the county of Los Angeles and State of California, have invented a new and useful Beet-Topper, of which the following is a specification.

This invention relates to means for cutting the tops off of beets or other root crops, and the main object of the present invention is to provide a machine for this purpose which will travel over the beets in such manner as to cut the beet tops without any tendency to push or overturn the beet by pressure from the machine.

A further object of the invention is to provide a beet topping machine with means for regulating the cutters in correspondence with the height of the beet or the depth of the beet below the ground, by lifting means movably mounted so as to travel over the tops of the beets and to exert a direct downward pressure thereon, so as to avoid any tendency to break or overturn the beets in the cutting operation.

Another object of the invention is to provide for lateral adjustment of the cutters.

Other objects of the invention will appear hereinafter.

The accompanying drawings illustrate embodiments of the invention, and referring thereto: Figure 1 is a side elevation of the machine, partly broken away, and with the nearer wheel removed. Fig. 2 is a plan view of the machine partly broken away. Fig. 3 is a partial rear view of the machine. Fig. 4 is a detail elevation of a clamp for the cutter bearings.

The machine comprises a suitable truck or frame adapted to travel over the ground, cutting devices drawn by said machine, and lifting means drawn by the machine and connected to the cutting devices to regulate the height or depth thereof. The frame of the machine may comprise a tongue or pole 1, provided with draft means 2, and frame bars 3 connected to said pole 1 and extending rearwardly at each side thereof, and connected at their rear ends to a cross bar 5, fastened to pole 1, and to vertical bars 4 bent out to form the axles 6 of the respective running wheels 7. The bars 4 are pivotally mounted at 4' on the bars 3 and may be angularly adjusted by means of brace bars 8 connected at their lower ends to the axles 6 and connected at their upper ends to the bars 3 by means of a bolt 9, engaging in a bracket 10 on each bar 3, and engaging in any one of a series of holes 11 in said brace bar 8. A seat 12 is supported on the rear end of the pole 1.

Two cutters 14 are provided, consisting of dished circular knives or disks having their shafts 15 journaled in bearings 16 on sleeves 17 which are mounted on a cross shaft 21 supported in a cutter frame connected to and movably mounted on frame 3. Said cutter frame may consist of side bars 18 pivotally mounted by sleeves 19 at their upper ends on a cross shaft 20 extending transversely of the machine, and journaled in bearings 36 on bars 3. Said cutter frame further comprises side bars 22 connected at their forward ends to the side bars 18 aforesaid, and extending rearwardly parallel to said side bars 18, said bars 18 and 22 being connected at their rear ends to a cross bar 24 by means of bolts 25 extending through holes 26 in said cross bar. Said cross bar 24 may be provided with foot rests 27 at opposite ends thereof. The sleeves 17 for carrying the cutter bearings are provided with arms 28 extending forwardly and slotted as at 29 to receive a fastening bolt 29' which screws into the side bars 18 aforesaid and engages by its head with the said arms 28 to hold the cutters in proper position, this position being such that the shafts of the cutters extend obliquely downward and rearward, the bearings 16 of said shafts being so positioned that the shafts also extend outwardly from their supports, and the cutters connected to the respective shafts are thus tipped inwardly toward the center and toward the front of the machine, the inner edges of said cutters being close together and preferably overlapping so as to sever the beet tops as the machine is drawn over the beets.

To hold the cutters at proper height or depth relatively to the tops of the beets, a lifting means is provided, consisting of a flexible endless belt or chain 30, mounted at its lower end on a drum or wheel 31 carried by a shaft 32 mounted in bearings 33 on the bars 22 aforesaid, said belt or chain being mounted at its upper end on a wheel or drum 34 carried by the shaft 20. The belt or chain 30 may be of the usual link belt construction, and may be provided with cross slats or bars 37 projecting therefrom, as indicated in Fig. 1, to give a more effective bearing contact with the beet tops. Chains 38, running on sprocket wheels 39 and 40 on the wheels 7 and shafts 20, respectively, serve to operate the lifting means positively by power applied from the running wheels 7, the proportions of the parts being such that the lower run of the endless chain or belt 30 constituting the lifting means moves rearwardly relatively to the machine frame substantially as fast as the machine frame moves forwardly over the ground, so that the portions of the lifting means which contact with the beet tops have substantially no forward or rearward movement with relation to said tops, but exert a direct downward pressure, thereby lifting the cutters to the proper elevation, without disturbing the beet. The bearings 36 may be movably mounted on the frame bars 3, said bearings, for example, being formed on brackets 42 having slots 43 to receive bolts or screws 44, and securing them in fixed position on the said bars 3, and an adjusting screw 45 being provided on a bracket 46 fixed on each side frame bar 3, said adjusting screw engaging the bracket 43 to move the same forwardly so as to tighten the driving chains 38 for the shaft 20.

The cutter frame is preferably mounted to be movable laterally as well as vertically, so as to enable it to be shifted so as to bring the cutters directly over the line of beets. For this purpose the sleeves 19 on the cutter frame are splined on the cross shaft 20 and a controlling lever 50 is pivotally mounted at 51 on the pole 1, and engages by pin and slot connection 52 with the cross bar 53 connecting the sleeves 19, the rear end of said lever 50 being in convenient position for operation by the person sitting on the seat 12, so that the lever can be manipulated to push the cutter frame laterally one way or the other, and hold the cutters directly over the beets notwithstanding deviations in the line of beets or movement of the truck to one side or the other. Means are also provided for lifting the cutter frame so as to raise the cutters and the aforesaid lifting means away from the ground when necessary, for example, when the machine is being hauled over the field without cutting. For this purpose a lever 56 pivotally mounted on the pole 1 is connected by a chain 57 to the cutter frame and is provided with a dog 58 engaging in a segment rack 59 to hold the lever in any desired position. When said lever is lowered, the aforesaid lifting means 30 rests on the ground and the cutters are thereby supported in position for topping the beets, and when the lever 56 is raised and held in raised position by said dog 58, it will hold the cutters and the other parts connected to the cutter frame away from the ground so as to allow the machine to travel over the ground without obstruction.

The operation is as follows: The machine being drawn along the row of beets, the wheels 7 run on the ground with the row between the wheels, and the cutters 14 embrace the row of beets between them so that as the cutters are drawn forward, they sever the beet tops, the oblique position of the cutters enabling them to penetrate the ground if necessary, to sever the top, it being understood that the word "top" as here used, includes not only the leaves and stalks, but the upper part of the beet which it is necessary to cut away in topping the beets. The lifting means 30 moves bodily along slightly in advance of the cutters, adjacent to the cutting point and runs on top of the beets, and said lifting means is connected to the shaft 21 which carries the cutters and will cause the cutters to be raised or lowered in correspondence with the height of the beets to be cut. The lifting means 30 engages with the beet tops in such manner as to produce a direct downward pressure on the tops without any lateral bending or pushing action thereon in any direction, the cross bars 37 being moved by the chain connections 38, 39, 40, at such speed that they have substantially no forward or rearward movement relatively to the ground or to the beet tops, but only a downward movement due to the inclination of the belt. On passing over the beet tops, the forward lower portion of the endless chain or belt engages with the beet tops, the point of engagement of the beet top with the belt being determined by the height of the beet. Thus a beet which projects to a considerable distance above the ground will come in contact with the lower run of the belt at a considerable distance in advance of the lowest portion of the belt, whereas a beet top which projects but little above the ground, will come in contact with the lower run of the belt, nearer the lowest portion thereof, and the motion of the portion of the belt engaging with the beet top being directly downward with relation to the beet top, it gives a direct downward bearing thereon, serving to lift or raise the cutters up on top of the beets without disturbing them. In devices of this character where rollers or shoes have been employed to regulate the height of the cutters, it has been found that any beets projecting a considerable distance above the ground are apt to be broken off or dislodged thereby, and the above described construction provides for overcoming this difficulty by causing the lifting means to ride over the beet top without exerting any pressure thereon except a downward pressure.

When the cutters become worn, they may be brought closer together by adjustment of the carrying bars 18 and 22 on the cross bar 24, the bolts 25 being shifted in the holes 26, said holes being formed as slots to enable such shifting.

What I claim is:

1. In a beet topper, the combination of a frame, wheels carrying said frame, a horizontal shaft mounted on said frame, driving means connecting said wheels to said shaft to rotate the shaft, a cutter frame hung from said shaft, wheels on said shaft and on said cutter frame, an endless belt mounted on said wheels and extending obliquely downward and rearward from the wheels on the shaft, to ride on the beet tops, and cutter means carried by said frame, adjacent the lower end of said belt, for cutting the beet tops.

2. In a beet topper, the combination of a frame, wheels carrying said frame, a horizontal shaft journaled on said frame, sprocket wheels on said shaft and on said carrying wheels respectively, a sprocket chain connecting said sprocket wheels to drive said shaft from said carrying wheels, a cutter frame hung on said shaft and swinging vertically thereon, a wheel carried by said shaft and rotating therewith, a wheel carried by said cutter frame at the lower end thereof, an endless belt mounted on said two last named wheels and extending obliquely downward and rearward from said shaft and adapted to ride on the beet tops, and cutter means carried by said frame adjacent to the lower end of said belt.

3. In a beet topper, the combination of a frame, wheels carrying said frame, a horizontal shaft journaled on said frame, sprocket wheels on said shaft and on said carrying wheels respectively, a sprocket chain connecting said sprocket wheels to drive said shaft from said carrying wheels, a cutter frame hung on said shaft and swinging vertically thereon, a wheel carried by said shaft and rotating therewith, a wheel carried by said cutter frame at the lower end thereof, an endless belt mounted on said two last named wheels and extending obliquely downward and rearward from said shaft and adapted to ride on the beet tops, cutter means carried by said frame adjacent to the lower end of said belt, said cutter frame being slidable longitudinally on said horizontal shaft, and manually controlled means on the first named frame for moving the said cutter frame endwise on said shaft.

In testimony whereof, I have hereunto set my hand at Los Angeles, California this 5 day of November, 1912.

WILLIAM R. GARDNER.

In presence of—
GEORGE T. HACKLEY,
MARTHA M. LANGE.